United States Patent [19]

Cho

[11] 4,359,203
[45] Nov. 16, 1982

[54] VALVE ASSEMBLY

[75] Inventor: Nakwon Cho, Knoxville, Tenn.

[73] Assignee: Electro Nucleonics, Inc., Fairfield, N.J.

[21] Appl. No.: 696,193

[22] Filed: Jun. 15, 1976

Related U.S. Application Data

[63] Continuation of Ser. No. 452,739, Feb. 8, 1974, abandoned.

[51] Int. Cl.³ .............................................. F16K 31/44
[52] U.S. Cl. ...................................... 251/77; 251/61.4; 251/167; 251/63.4; 251/196; 251/337
[58] Field of Search ....................... 251/61.4, 158, 203, 251/204, 196, 167, 169, 197, 176, 199, 63.4, 85, 337, 80, 77

[56] References Cited

U.S. PATENT DOCUMENTS

| | | | |
|---|---|---|---|
| 2,758,813 | 8/1956 | Anderson | 251/167 |
| 2,906,491 | 9/1959 | Young | 251/167 |
| 2,977,989 | 4/1961 | Meynell | 251/80 X |
| 3,051,434 | 8/1962 | Gulick | 251/167 |

Primary Examiner—Harold W. Weakley
Attorney, Agent, or Firm—Robert Scobey

[57] ABSTRACT

A valve structure in which a valve member moves into and out of contact with first and second valve seating areas, the valve member contacting the seating areas with different forces. The movable valve member is comprised of block members coupled together so that a change in their relative longitudinal positions produces a corresponding change in their relative transverse positions. A stem member moves the block members to spaced longitudinal positions and produces different longitudinal separating forces between the block member in these positions thereby to urge one of the block members in a transverse direction with different forces against the valve seating areas. The application of forces directly through block members and indirectly through springs is employed to provide different valve seating forces. Block members for valve port blocking and valve port opening are utilized. A shock absorbing structure incorporating a movable spring holder is also utilized.

3 Claims, 11 Drawing Figures

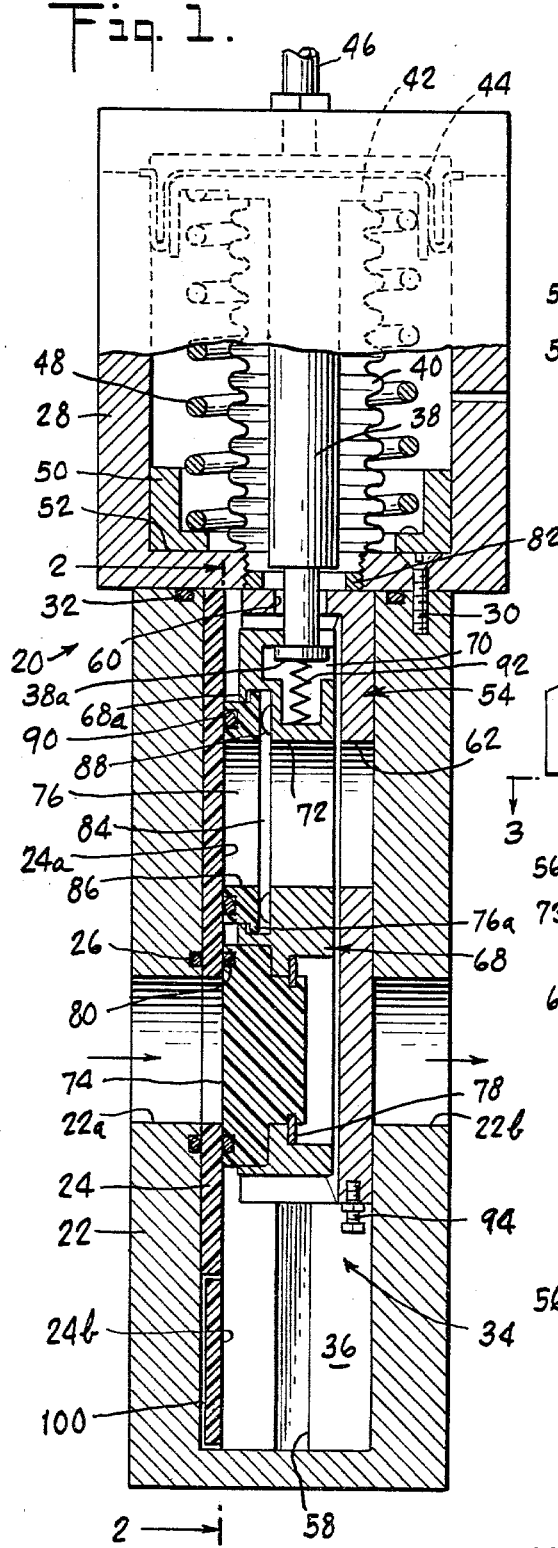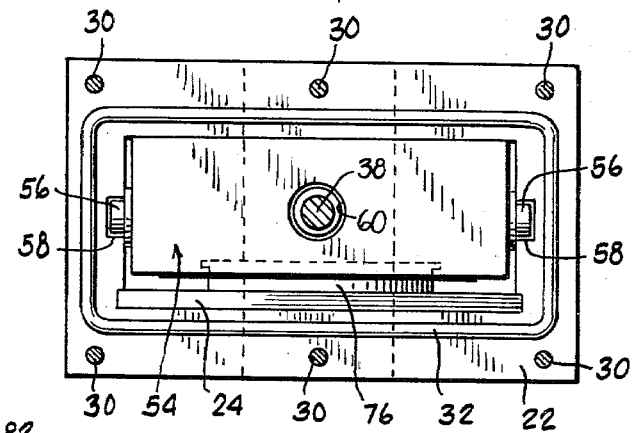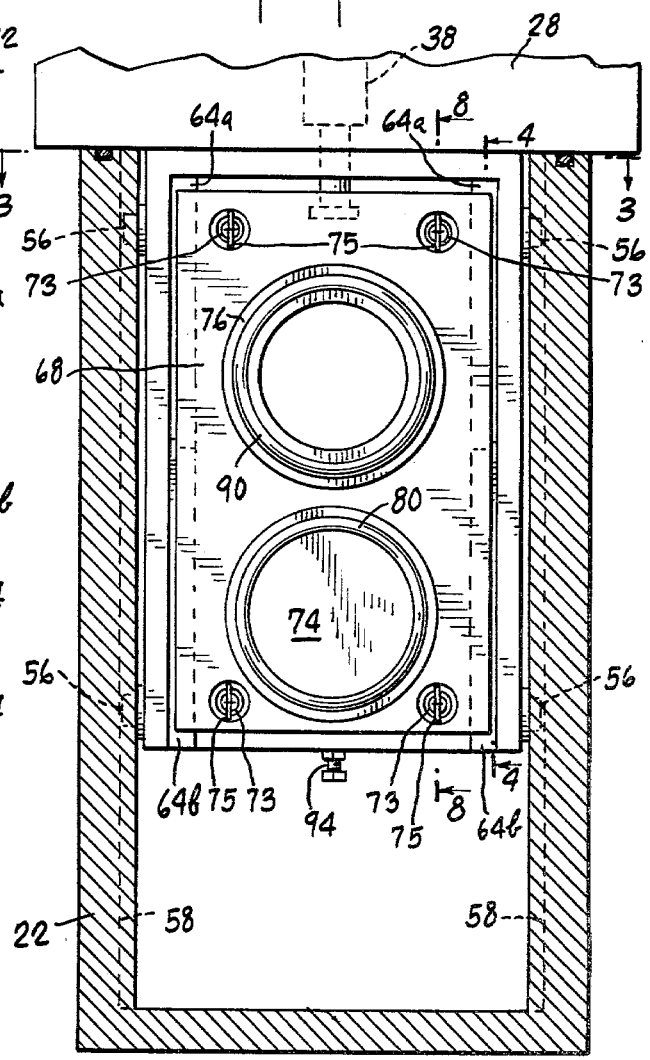

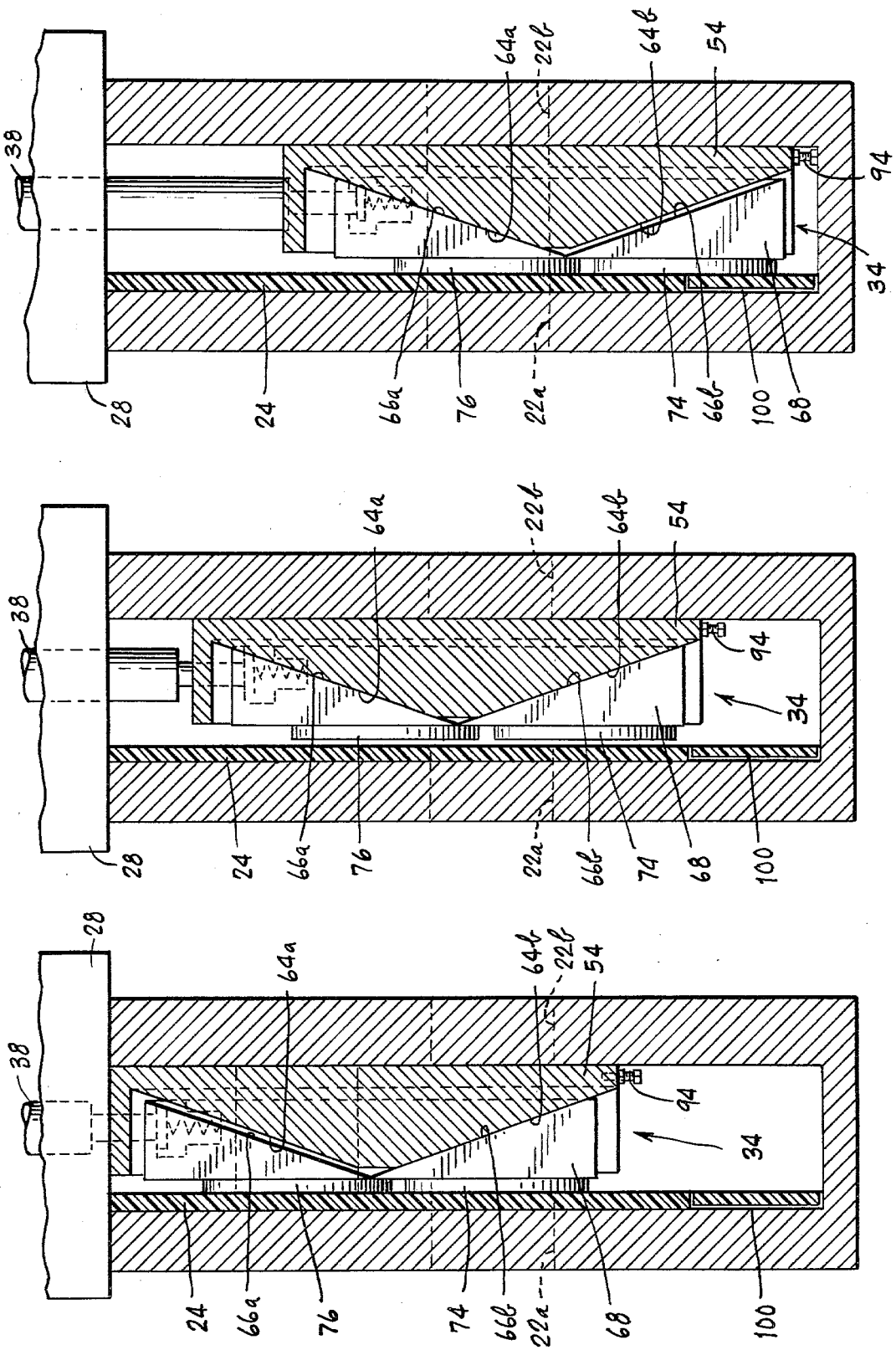

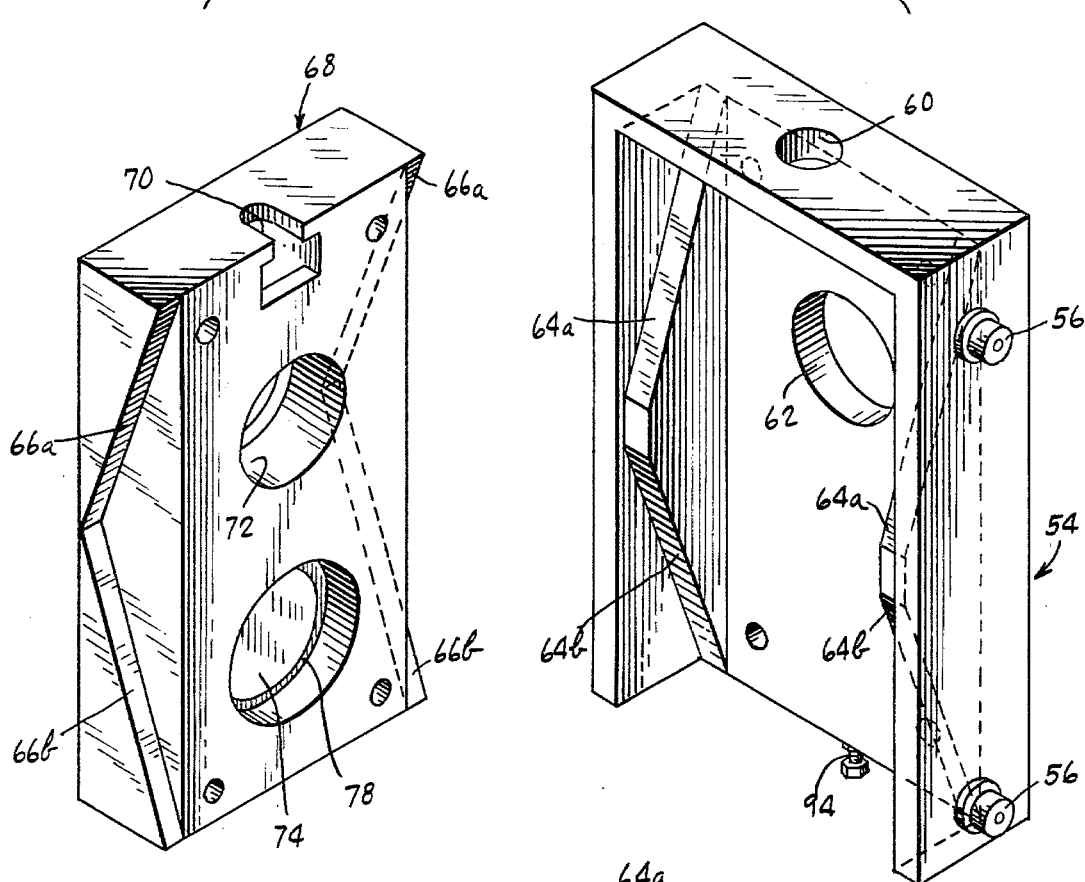
Fig. 7.
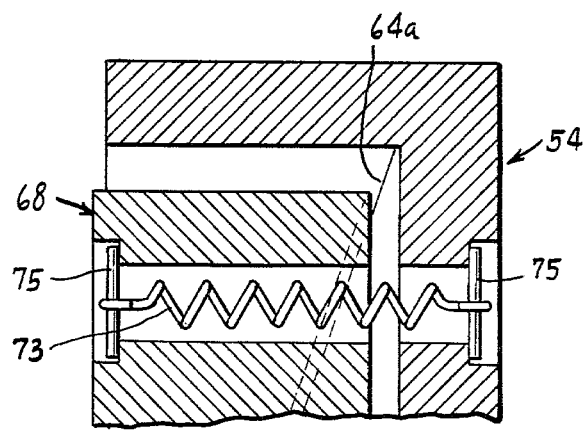
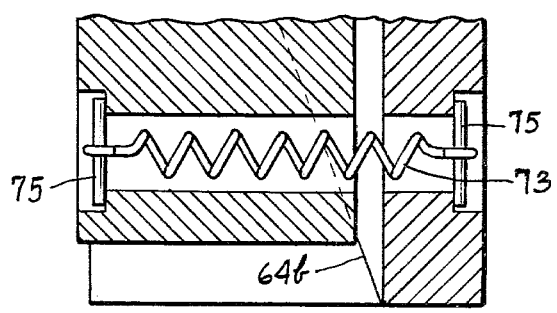
Fig. 8.

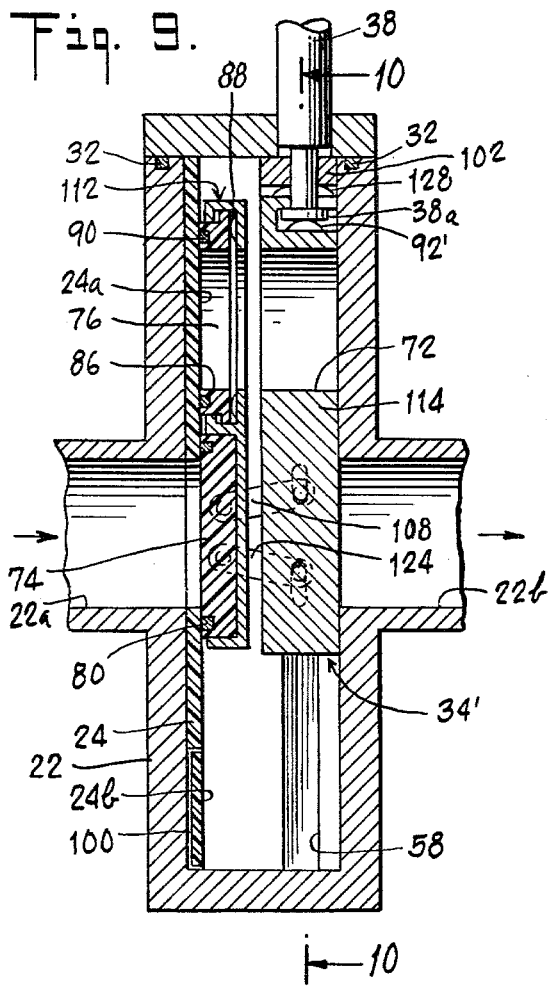
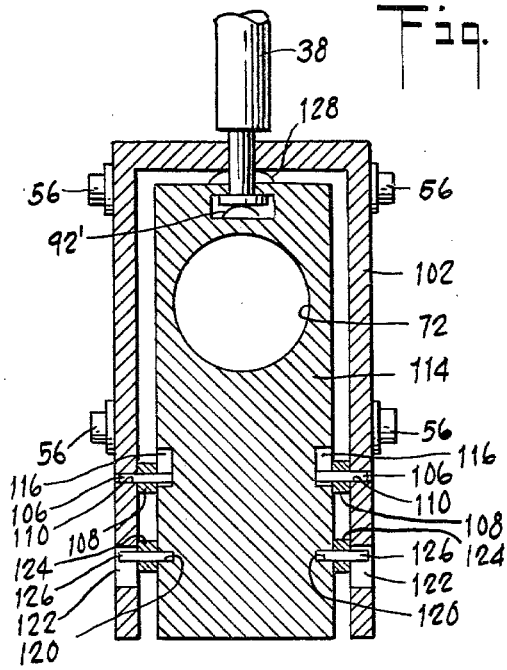
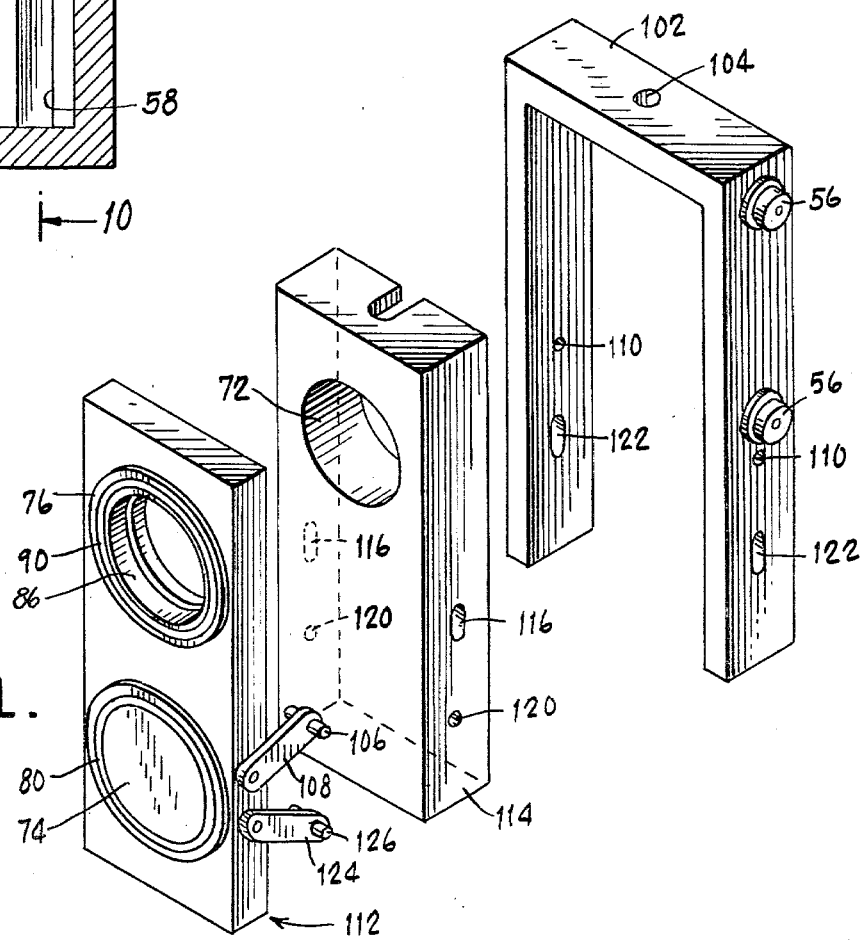

VALVE ASSEMBLY

This is a continuation of application Ser. No. 452,739 filed Feb. 8, 1974, now abandoned.

BACKGROUND AND BRIEF DESCRIPTION OF THE INVENTION

This invention relates to valve structures, and more particularly to a valve assembly for controlling the flow of fluid through a valve port. The invention finds particular application to valving for vacuum processes and those in which the fluid passing through the valve is harmful to the valve seals.

In the present invention a valve structure is utilized in which the seat of the valve port is protected at all times, regardless of whether the valve is open or closed. The seals are also protected at all times in both valve closed and valve open positions.

A unique structure is utilized involving block members which move relatively longitudinally as well as tranversely. Differential seating forces are employed in valve open and valve closed positions, as well as a shock absorbing structure for absorbing shocks upon the fast actuation of the valve.

The invention will be more completely understood by reference to the following detailed description, taken in conjunction with the appended drawings.

BRIEF DESCRIPTION OF THE DRAWINGS

FIG. 1 is a partly sectional view of a valve assembly embodying the invention.

FIG. 2 is a sectional view taken along the section 2—2 in FIG. 1.

FIG. 3 is a sectional view taken along the section 3—3 in FIG. 2.

FIGS. 4, 5 and 6 are sectional views showing the valve structure of FIG. 1 respectively in valve closed, intermediate, and valve open positions, all taken along the section 4—4 of FIG. 2.

FIG. 7 is a perspective view of block members forming part of the valve structure of FIG. 1.

FIG. 8 is a sectional view taken along the section 8—8 of FIG. 2.

FIG. 9 is a sectional view of another valve structure embodying the invention.

FIG. 10 is a sectional view taken along the section 10—10 of FIG. 9.

FIG. 11 is a perspective view of block members forming a part of the valve structure of FIG. 9.

DETAILED DESCRIPTION

Referring to FIG. 1, a valve structure 20 is shown that includes a housing 22. The housing 22 includes ports 22a and 22b through which a fluid flows as indicated by the arrows in FIG. 1. One side of the housing 22 (adjacent the port 22a) includes an insert 24. The insert which may be of Teflon or Teflon coated steel, for example, is sealed to the housing 22 by means of an O-ring seal 26. The material of the housing 22 may be of any suitable metal, for example, aluminum, and the O-ring material may be any suitable sealing material such as Viton, for example. The housing 22 is secured to an upper housing part 28 by means of screws 30. The housing parts 22 and 28 are sealed together by O-ring seal 32.

The valve structure 20 includes a movable valve member 34. This valve member moves within a cavity 36 within the housing 22 and is driven by a movable stem member 38. The stem member 38 engages a part of the movable valve member 34, as will be described in more detail below, and extends upwardly into the upper valve housing 28. The stem member 38 is positioned inside a bellows 40 and terminates at its upper end in a cap 42 positioned inside a flexible diaphragm 44. The bellows 40 may be of thin metal, such as bronze, for example, while the diaphragm 42 may be of any suitable flexible material such as rubber, for example. Fluid is admitted under pressure to conduit 46 which communicates with the upper surface of the diaphragm 44, forcing the stem member 38 downwardly against the action of spring 48. When pressure is removed from the conduit 46, the spring 48 returns the stem member to its uppermost position, the same as shown in FIG. 1. The spring 48 is seated in a spring holder 50 which in turn is seated against a wall 52 forming a part of the upper housing 28. The spring holder 50 is free to slide upwardly and downwardly within the upper housing 28. By this arrangement shocks are absorbed in the spring 48 upon the actuation of the movable valve member 34. In particular, as that movable valve member strikes the upper housing 28 on the side of the wall 52 opposite from that against which the spring holder bears, shocks transmitted through the wall 52 cause the holder 50 to move upwardly compressing the spring 48, thereby to absorb the shock.

The movable valve member 34 comprises a first block member 54 of aluminum, for example, which is free to slide within the housing cavity 36 by means of rollers 56 mounted thereto (see also FIGS. 2 and 3) free to slide in channels 58 in opposing walls of the lower housing 22. The first block member 54 includes an opening 60 through which the lower portion of the stem member 38 passes. The first block member 54 is shown in perspective view in FIG. 7. As noted from that figure, as well as FIG. 1, the block member 54 includes a passage 62 therethrough. This block member is also formed on inside surfaces thereof with V-shaped inclined surfaces 64a and 64b. These inclined surfaces mate with corresponding inclined surfaces 66a and 66b of a second block member 68. This second block member is a part of the movable valve member 34 as shown in FIG. 1. The block member 68 includes a cavity 70 at the upper end thereof which is adapted to receive enlarged end 38a of stem member 38 as shown in FIG. 1. The block member 68 includes a passage 72 therethrough which aligns with the passage 62 through the block member 54. The two block members 54 and 68 are held together by springs 73, pinned as at 75 (FIGS. 2 and 8).

With reference particularly to FIG. 1, the block member 68 carries two parts 74 and 76. The first part 74 is a fluid blocking structure and consists of a block of material, for example, Teflon or Teflon coated metal, which is secured to the block member 68 by a retaining ring 78 (see also FIG. 7). This part 74 of the block member 68 includes a sealing means such as an O-ring seal 80 on the face thereof adjacent the port 22a. That part of the insert surface 24 surrounding the port 22a and which is contacted by the O-ring seal 80 constitutes a first valve seating area. The part 74 blocks the valve port and prevents fluid from passing through the valve port. As shown in FIG. 1 this position of the entire valve structure is in the valve "closed" position.

Refer now to FIG. 4 of the drawings. This shows the valve structure in the valve "closed" position. In this position of the movable valve member 34 in which the O-ring 80 is seating against the surface of the insert 24 surrounding the valve port 22a, the stem member 38 is pulling upwardly directly against the block member 68 by virtue of the enlarged end 38a of the stem member 38 directly contacting one of the surfaces of the cavity 70 of that block member. Thus the inclined surface 66b of the block member 68 is in direct contact with and urged against the inclined surface 64b of the block member 54. The block member 54 is at its uppermost position in which its top surface bears against an insert 82 which is threaded into the wall 52 of the upper housing 28. The threaded insert 82 determines the uppermost position of the movable valve member 34 and hence the block member 54. Suitable adjustment of the insert 82 results in appropriate positioning of the valve member 34 with respect to the valve port 22a.

In the uppermost position of the block member 54, and with the stem member 38 urging the block member 68 upwardly against the block member 54 as just explained, the block member 68 is displaced transversely to the left with respect to the valve structure orientation shown in FIGS. 1 and 4. Such transverse movement of the block member 68 causes the blocking part 74 thereof to impinge against the first valve seating area which is constituted by the surface of the insert 24 that surrounds the valve port 22a. In this fashion the O-ring 80 is forced against the valve seat constituted by this area of the surface of the insert 24, thereby closing off the valve port 22a and preventing fluid flow therethrough. The force with which the O-ring is seated is determined by the upward force exerted by the stem member 38 urging the block member 68 upwardly which is translated by the engaged inclined surfaces 64b and 66b into a transverse force of the O-ring against the valve seat. This transverse force, ultimately dependent upon the force of the spring 48 which provides the upward bias of the shaft member 38, is chosen sufficiently great to ensure an appropriate seal closing off the valve port 22a.

Referring again particularly to FIG. 1, the second part 76 of the block member 68 is transversely movable within the block member by virtue of its being carried out within a cavity 84 therein. This part of the block member essentially constitutes a ring of material having an opening 86 therethrough which is in communication with the opening 72 through the remainder of the block member 68. The part 76 includes a rim 76a thereon which engages a corresponding rim 68a, limiting the outward or leftward movement of the part 76 with reference to the orientation of parts as shown in FIG. 1. A spring 88 biases the part 76 in the leftward direction with reference to FIG. 1 so that the part 76 bears against the adjacent surface of the insert 24. An O-ring seal 90 is included in the part 76 forming a seal between that part and the adjacent surface of the insert 24.

In the position of the valve structure shown in FIG. 1, the part 76 is positioned adjacent an upper section of the insert 24 which is termed herein a second wall portion of the valve structure. This second wall portion of the valve structure is designated 24a in FIG. 1. The surface of the insert 24 at the lower portion thereof designated 24b in FIG. 1, is designated herein a first wall portion of the valve structure. As noted above, when the movable valve member 34 is in the position shown in FIGS. 1 and 4, the valve structure is in the "valve closed" position with the part 74 blocking the valve port 22a. In this position of the valve structure, the block member 54 is in a first position. The O-rings 80 and 90 are seated against the adjacent surfaces of the insert 24, the O-ring 90 seating with a light force determined by the force of the spring 88 while the O-ring 80 is seated with a greater force determined by the upward force exerted by spring 48. Assume now that the stem member 38 is moved downwardly so that the valve structure is to be placed within the "valve open" position.

Refer to FIGS. 1 and 5 together. FIG. 5 shows the intermediate position of the valve structure in which the stem member 38 has moved downwardly. In the initial downward movement of the stem member 38 from the position of the valve structure shown in FIG. 4, the enlarged end 38a of the stem member moves downwardly against a spring 92 contained within the cavity 70 of the block member 68. This compression of the spring 92 and the biasing action of springs 73 (FIG. 8) cause relative longitudinal movement between the block members 54 and 68, as well as transverse movement. In particular, the block members move relatively along the mating inclined surfaces 64b and 66b until the inclined surfaces 64a and 66a mate as shown in FIG. 5. Thus the block member 68 moves to the right with respect to the orientation of parts shown in FIGS. 1 and 5, moving the O-rings 80 and 90 out of engagement with the surface of the insert 24. In the initial downward movement of the stem member 38, the movement of parts is such that the block member 68 moves to the right and slightly downwardly until all inclined surfaces 64a, 66a, and 64b, 66b are engaging. Further downward movement of the stem member causes downward movement of the blocks 54 and 68 together to the intermediate position shown in FIG. 5.

The stem member 38 moves downwardly still further until an adjustable stop 94 positioned at the bottom of the block member 54 engages the bottom surface of the lower housing 22. The stop 94 is adjusted for proper positioning of the valve parts with respect to the port 22a. A slight further downward movement of the stem member 38 causes a compression of the spring 92 urging the block member 68 slightly downwardly and to the left along the mating and engaging surfaces 64a and 66a. The block member 68 thus moves to the left as shown in FIG. 6 until the O-ring 90 (see FIG. 1) is positioned against the portion of the insert 24 surrounding the valve port 22a and constituting a valve seat. In this position of the valve structure, the opening 86 through the part 76 is in fluid communication with the valve port 22a, and fluid can flow from the valve port and through this opening and through openings 72 and 62 outwardly through port 22b. The force with which the O-ring 90 seats against the valve seat is determined by the spring 88. The force with which the O-ring 80 of the valve part 74 seats against the surface 24b of the insert 24 is determined by the downward force of the compressed spring 92. It will be noted, then, that the valve part 74 seats in the two positions of the valve structure with different forces. In the upper position of the valve structure, shown in FIG. 1, the seating force of the O-ring 80 is determined by the spring 48; in the lower position of the valve structure shown in FIG. 6, the seating force of the O-ring 80 is determined by the spring 92. In both positions of the valve structure, the seating force of the O-ring 90 is determined by the force of the spring 88.

In the lower most position of the valve structure as shown in FIG. 6, a venting passage 100 provides for a venting of any trapped gases between the insert surface 24b and the surface of the blocking part 74.

It will be noted that the valve seat constituted by the surface of the insert 24 surrounding the valve port 22a is at all times protected by O-ring seals, i.e., the O-ring 80 or the O-ring 90. In all positions of the valve, i.e., valve "open" and valve "closed", the O-ring seals 80 and 90 are seated against surfaces of the insert 24. Thus the valve seat surrounding the port 22a as well as the O-ring seals are protected in all positions of the valve structure and the fluid passing through the valve is not permitted to harm these structures.

FIGS. 9 to 11 show an alternative valve structure. Reference numerals the same as those used in the preceding figures have been used in FIGS. 9 to 11 to designate components that are not changed. Movable valve member 34' is constituted by a first block member 102 that is shaped in the form of a yoke and which carries rollers 56 which move in channels 58 in lower valve housing 22. The first block member 102 is shaped in the form of a yoke. A hole 104 is included in the top part of the yoke through which the lower portion of the stem member 38 passes. Pins 106 attached to links 108 are pinned in corresponding holes 110 in the sides of the yoke-shaped block member 102. The links 108 are similarly pinned to a part 112. The part 112 carries O-ring seals 80 and 90. Positioned inside the yoke 102 is a block-shaped part 114 which includes slots 116 along the sides thereof that are aligned with the holes 110 in the yoke 102. The part 114 also includes holes 120 in the sides thereof which are aligned with corresponding slots 122 in the yoke 102. Links 124 are pinned to the part 112 as are the links 108 and include pins 126 that are loosely received in the slots 122 in the yoke 102. It will be noted that, with respect to the part 114, the pins 106 are loosely received in the slots 116, while the pins 126 are pinned within the holes 120 in that part. By this linkage of parts 102, 114 and 112, relative longitudinal movement between the yoke 102 and part 114 causes a corresponding transverse movement between the part 114 and the part 112.

Refer again to FIGS. 9 and 10. It will be noted that a spring 128 biases the yoke 102 and the part 114 away from each other. In the uppermost position of the movable valve member 34' as shown in FIG. 9, the stem member 38 is urging the part 114 upwardly, thereby compressing the spring 128. In this position the yoke 102 is in its uppermost position within the housing 22. The upward urging of the part 114 causes a corresponding urging to the left of the part 112, by virtue of the links 124 which are urged toward a horizontal position from an inclined position. The force with which the O-ring 80 seats against the valve seat is determined by the upward force exerted by the stem member 38. The force with which the O-ring 90 seats against the adjacent surface of the insert 24 is determined by the force of the spring 88 as in the embodiment of FIGS. 1 to 8.

As the stem member 38 is moved downwardly, initially the part 114 moves downwardly within the yoke 102 thereby moving the part 112 away from the insert 24. Thus the O-ring seals 80 and 90 move away from the insert 24. Further downward movement of the stem member 38 continues until the yoke 102 is seated against the bottom of the lower housing 22. A slight further movement of the stem member 38 is permitted, compressing the spring 92' and moving the part 114 slightly downwardly. In this case the link 108 is urged to its horizontal position, moving the part 112 toward the left to cause the O-ring seal to seat against the lower part of the insert 24 and the O-ring seal 90 to seat about the valve port 22a. Again, the seating pressure of the O-ring seal 90 is determined by the spring 88. The seating pressure of the O-ring seal 80 is determined by the compressive force of the spring 92'.

As will be noted, as in the case of the valve of FIGS. 1 to 8, the structure of FIGS. 9 to 11 involve seating by the O-ring 80 at different pressures, while a uniform seating pressure is exerted by the O-ring seal 90. Again, the valve seat surrounding the port 22a is protected at all times by O-ring seals, and the O-rings seals are in turn protected at all time by virtue of their continuous contact with the insert 24 (except for those times during which the valve is moving between its "open" and "closed" positions).

In the structures shown, only the port 22a is closed. Although the valve parts 54 and 114 bear against the surface of the housing 22 adjacent the port 22b, in vacuum operations such an engagement of parts does not result in a seal.

It will be appreciated that the above presently preferred embodiments of the invention are subject to modification. Accordingly, the invention should be taken to be defined by the appended claims.

I claim:

1. A valve structure comprising a valve member movable into and out of contact with first and second valve seating areas, first closure means for urging said valve member into engagement with said first valve seating area with a first force, and second closure means for urging said valve member into engagement with said second valve seating area with a second force less than said first force, said valve member comprises first and second block members coupled together so that a change in the relative positions therebetween along a longitudinal direction produces a change in the relative positions therebetween in a transverse direction, a stem member coupled to said first block member for moving it to first and second positions in which said second block member is positioned respectively adjacent said first and second valve seating areas, said stem member urging said first and second block members apart in a first longitudinal sense with a predetermined force when said first block member is in said first position and urging said first and second block members apart in an opposite longitudinal sense with another force less than said predetermined force when said first block member is in said second position thereby to urge said second block member against said first and second valve seating areas with said first and second different forces, said first and second valve seating areas respectively comprise a valve port and a first wall portion of said valve structure, said second block member includes a first part thereof for blocking fluid flow, said first part having sealing means thereon, said sealing means sealingly engaging said valve port when said first block member is in said first position to block fluid flow in said valve port, said sealing means sealingly engaging said first wall portion of said valve structure when said first block member is in said second position, said second block member includes a second part thereof having a fluid passage therethrough, sealing means on said second part, the sealing means on said second part sealingly engaging a second wall portion of said valve structure when said first block member is in said first position, the sealing means on said second part sealingly engaging said valve port when said first block member is in said second position to provide fluid communication between said valve port and the fluid passage through said second part, and said second part is spring-biased to provide the same sealing pressure between the sealing means thereon and said second wall portion of said valve structure and said valve port.

2. A valve structure according to claim 1 in which said first and second block members include V-shaped inclined surfaces thereon mating with each other to provide for said transverse positional change.

3. A valve structure according to claim 1 in which said first and second block members are linked together by diverging links to provide for said transverse positional change.

* * * * *